(12) United States Patent
Dana et al.

(10) Patent No.: US 11,501,115 B2
(45) Date of Patent: Nov. 15, 2022

(54) EXPLAINING CROSS DOMAIN MODEL PREDICTIONS

(71) Applicant: International Business Machines Corporation, Armonk, NY (US)

(72) Inventors: Saswati Dana, Bangalore (IN); Dinesh Garg, Peawar (IN); Saneem Chemmengath, Kozhikode (IN); Sreyash Kenkre, Bangalore (IN); L. Venkata Subramaniam, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 16/790,956

(22) Filed: Feb. 14, 2020

(65) Prior Publication Data
US 2021/0256319 A1 Aug. 19, 2021

(51) Int. Cl.
*G06K 9/00* (2022.01)
*G06K 9/62* (2022.01)
*G06N 20/00* (2019.01)

(52) U.S. Cl.
CPC .......... *G06K 9/6265* (2013.01); *G06K 9/623* (2013.01); *G06K 9/6215* (2013.01); *G06K 9/6259* (2013.01); *G06N 20/00* (2019.01)

(58) Field of Classification Search
CPC .... G06K 9/6265; G06K 9/6215; G06K 9/623; G06K 9/6259; G06N 20/00
See application file for complete search history.

(56) References Cited

U.S. PATENT DOCUMENTS

| | | | |
|---|---|---|---|
| 11,205,103 B2* | 12/2021 | Zhang | G06K 9/6269 |
| 2016/0253597 A1 | 9/2016 | Bhatt et al. | |
| 2018/0114334 A1* | 4/2018 | Desai | G06V 10/82 |
| 2018/0165554 A1* | 6/2018 | Zhang | G06K 9/6256 |

(Continued)

FOREIGN PATENT DOCUMENTS

CN 105787513 A 7/2016

OTHER PUBLICATIONS

Margolis A., A Literature Review of Domain Adaptation with Unlabeled Data, Tec. Report. Mar. 23, 2011, pp. 1-42.

(Continued)

*Primary Examiner* — Samir A Ahmed
(74) *Attorney, Agent, or Firm* — Ryan, Mason & Lewis, LLP

(57) ABSTRACT

Methods, systems, and computer program products for explaining cross domain model predictions are provided herein. A computer-implemented method includes providing a test data point to a domain adaptation model to obtain a prediction, wherein the domain adaptation model is trained on a set of labeled data points and a set of unlabeled data points. The method includes generating a task specific explanation for the prediction that includes one or more data points from among the sets that satisfy a threshold score for influencing the prediction. Additionally, the method includes generating a domain invariant explanation for the prediction. The domain variation explanation is generated by ranking pairs of data points based on a statistical similarity to the test data point, wherein each pair includes a data point from the set of labeled data points and a data point from the set of unlabeled data points.

19 Claims, 6 Drawing Sheets

(56) References Cited

U.S. PATENT DOCUMENTS

| | | | |
|---|---|---|---|
| 2019/0066493 A1* | 2/2019 | Sohn | G06V 10/82 |
| 2019/0356684 A1* | 11/2019 | Sinha | H04L 63/1458 |
| 2020/0134427 A1* | 4/2020 | Oh | G06N 20/20 |
| 2020/0334538 A1* | 10/2020 | Meng | G06N 3/0454 |
| 2021/0133585 A1* | 5/2021 | Lee | G06N 5/046 |

OTHER PUBLICATIONS

Koh, P.W., et al., Understanding Black-box Predictions via Influence Functions, Proceedings of the 34th International Conference on Machine Learning—vol. 70, Aug. 6, 2017, JMLR.org, pp. 1885-1894.

Ganin et al., Unsupervised Domain Adaptation by Backpropagation, arXiv preprint arXiv: 1409.7495, Sep. 26, 2014.

Pei, Zhongyi, et al., Multi-Adversarial Domain Adaptation Thirty-Second AAAI Conference on Artificial Intelligence, Apr. 29, 2018.

Cao, Zhangjie, et al., Learning to Transfer Examples for Partial Domain Adaptation, Proceedings of the IEEE Conference on Computer Vision and Pattern Recognition, Mar. 28, 2019.

Gopalan, R., et al., Unsupervised Adaptation Across Domain Shifts by Generating Intermediate Data Representations, IEEE Transactions on Pattern Analysis and Machine Intelligence, vol. 36, No. 11, Dec. 13, 2013, pp. 2288-2302.

\* cited by examiner

EXPLAINING CROSS DOMAIN MODEL PREDICTIONS

FIELD

The present application generally relates to information technology and, more particularly, to machine learning explanations.

BACKGROUND

Generally, domain adaptation refers to techniques in machine learning that use labeled data in one or more source domains to solve new tasks in a target domain. The level of relatedness between the source and target domains generally determines how successful the adaptation will be. Thus, for domain adaptation models, it is important to know this level of relatedness.

SUMMARY

In one embodiment of the present invention, techniques for explaining cross domain model predictions are provided. An exemplary computer-implemented method includes providing at least one test data point to a domain adaptation model to obtain at least one prediction, wherein the domain adaptation model is trained on (i) a set of labeled data points and (ii) a set of unlabeled data points; generating a task specific explanation for the at least one prediction, the task specific explanation comprising one or more data points from among the sets that satisfy a threshold score for influencing the at least one prediction; and generating a domain invariant explanation for the at least one prediction, wherein the generating comprises ranking pairs of data points based on a statistical similarity to the at least one test data point, wherein each pair comprises (i) a data point from the set of labeled data points and (ii) a data point from the set of unlabeled data points, and wherein the domain invariant explanation comprises at least one of the pairs.

Another exemplary computer-implemented method includes providing at least one test sample as input to a domain adaptation model, wherein the domain adaptation model is trained using (i) a set of unlabeled training samples and (ii) a set of labeled training samples; obtaining, from the domain adaptation model, a prediction for the at least one test sample; determining scores for (i) training samples in the set of unlabeled samples and (ii) training samples in the set of labeled samples, wherein each score is indicative of an influence of a given one of the training samples on the prediction of the at least one test sample; generating a task specific explanation for the prediction based at least in part on the determined scores; generating a domain invariant explanation for the prediction by applying a nearest-neighbors algorithm to identify at least one pair of training samples that are statistically similar to the test sample, wherein the at least one pair comprises (i) one of the labeled training samples and (ii) one of the unlabeled training samples; and outputting the task specific explanation and the domain invariant explanation to debug the domain adaptation model.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Generally, it is difficult to provide insight into the behavior and process of complex systems, machines, or algorithms that use machine learning models. A prediction may be explained by, for example, fitting a simple model around a test point or by perturbing the test point to see how the prediction changes. When test data are drawn from a similar distribution, having an accurate domain adaptation technique becomes an important part of the model. It also is difficult to explain a prediction when a test point is taken from a different distribution. Also, it is helpful to explain a prediction of test data with respect to both the labeled training data and the unlabeled data.

The exemplary embodiments herein describe techniques for explaining cross domain model predictions. At least one exemplary embodiment includes explaining a prediction of a domain adaptation model for test data that are taken from a distribution other than labeled training data by, for example, tracing the prediction through the model's learning algorithm and back to the labeled data and unlabeled data, where the model parameters ultimately derive from. At least one example embodiment includes evaluating an influence function to trace back these training data points.

Figure 1:
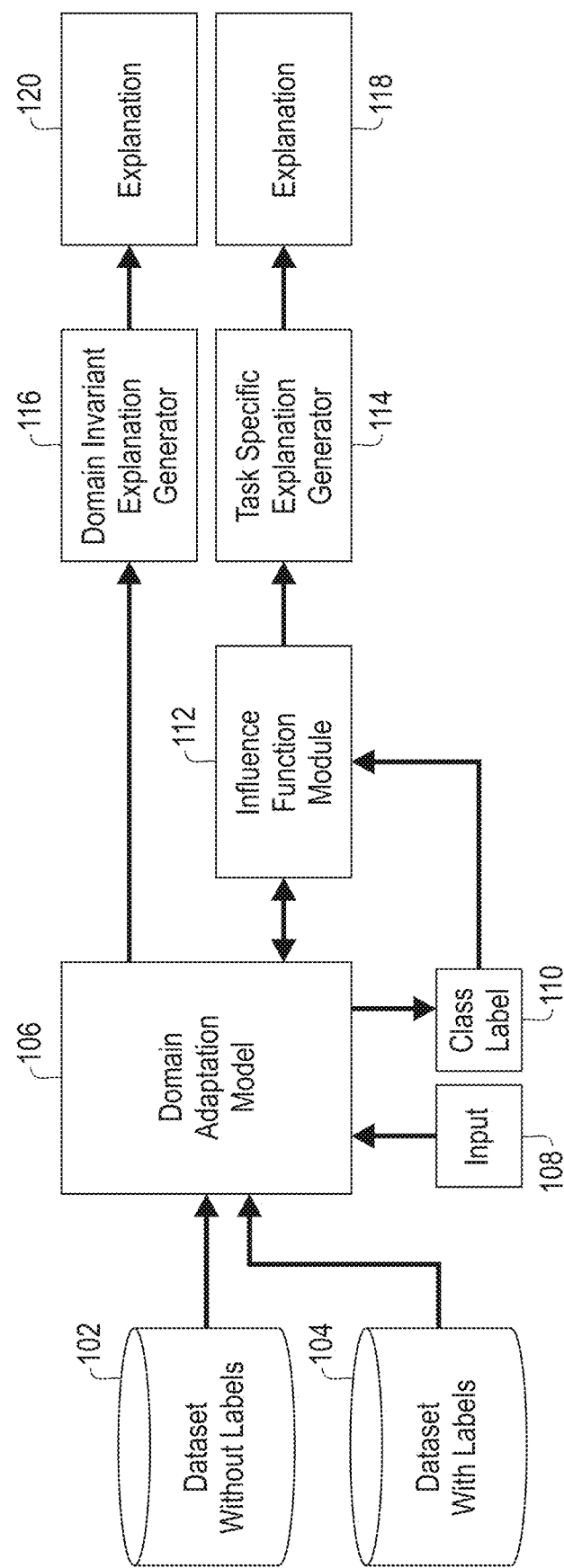
FIG. 1 is a diagram illustrating system architecture, according to an exemplary embodiment of the invention.

Referring now to FIG. 1, this figure is a diagram illustrating a system architecture in accordance with exemplary embodiments. By way of illustration, FIG. 1 depicts a domain adaptation model 106, an influence function module 112, a task specific explanation generator 114, and a domain invariant explanation generator 116. As a non-limiting example, the domain adaptation model 106 may correspond to a domain-adversarial neural network (DANN) (see, e.g., Ganin et al., *Unsupervised Domain Adaptation by Backpropagation*, arXiv preprint arXiv:1409.7495, 26 Sep. 2014, which is hereby incorporated by reference in its entirety).

In the example shown in FIG. 1, the domain adaptation model 106 is trained using a target dataset 102 (i.e., a dataset without labels) and a source dataset 104 (i.e., a dataset with labels). Given a data sample as input 108, the trained domain model 106 outputs a prediction, which in this example is in the form of a class label 110.

The influence function module 112 measures the influence of different examples on the prediction, for example, the influence function module 112 may approximate how a prediction for one or more test samples would change when a particular training instance is removed before training the model. The training instance may correspond to a data sample in the target dataset 102 or the source dataset 104. As such, the influence function module 112 may find influential samples in both the target dataset 102 and the source dataset 104. By way of example, the results of the influence function module 112 may indicate an influence (e.g., positive, negative, or neutral) that each training sample has on a given prediction. As a non-limiting example, the results may comprise a vector having a dimension equal to the total number of training samples (i.e., training samples from the both datasets 102, 104) for a certain test sample to indicate these influences.

The results of the influence function module 112 are provided as input to the task specific explanation generator 114. The task specific explanation generator 114 ranks the most influential training samples from the datasets 102, 104, and outputs one or more of these training samples as an explanation 118.

The domain invariant explanation generator 116 learns domain-invariant representations of all training instances (i.e., from both datasets 102, 104). For a given test instance, the domain invariant explanation generator 116 identifies the nearest data point(s) in the source dataset 104 and the nearest data point(s) in the target dataset 102 within the representation space. Among the identified data points, the domain invariant explanation generator 116 generates pairs of the identified target data point(s) and the identified source data point(s), and outputs one or more of these pairs as an explanation 120. As such, the explanations 118, 120 provide insights to the task prediction aspect and the domain invariant representation aspect of the domain adaption model 106. It is noted that the objective function for a domain adaptation model is different than a single-domain objective function. For example, the objective function for a domain adaptation model takes instances from both the source and target datasets. Also, adversarial domain adaptation is a minimax optimization problem. As such, typical influence functions do not work in case of adversarial domain adaptation models. One or more or embodiments described herein allow influence functions to be used in such cases.

Figure 2:
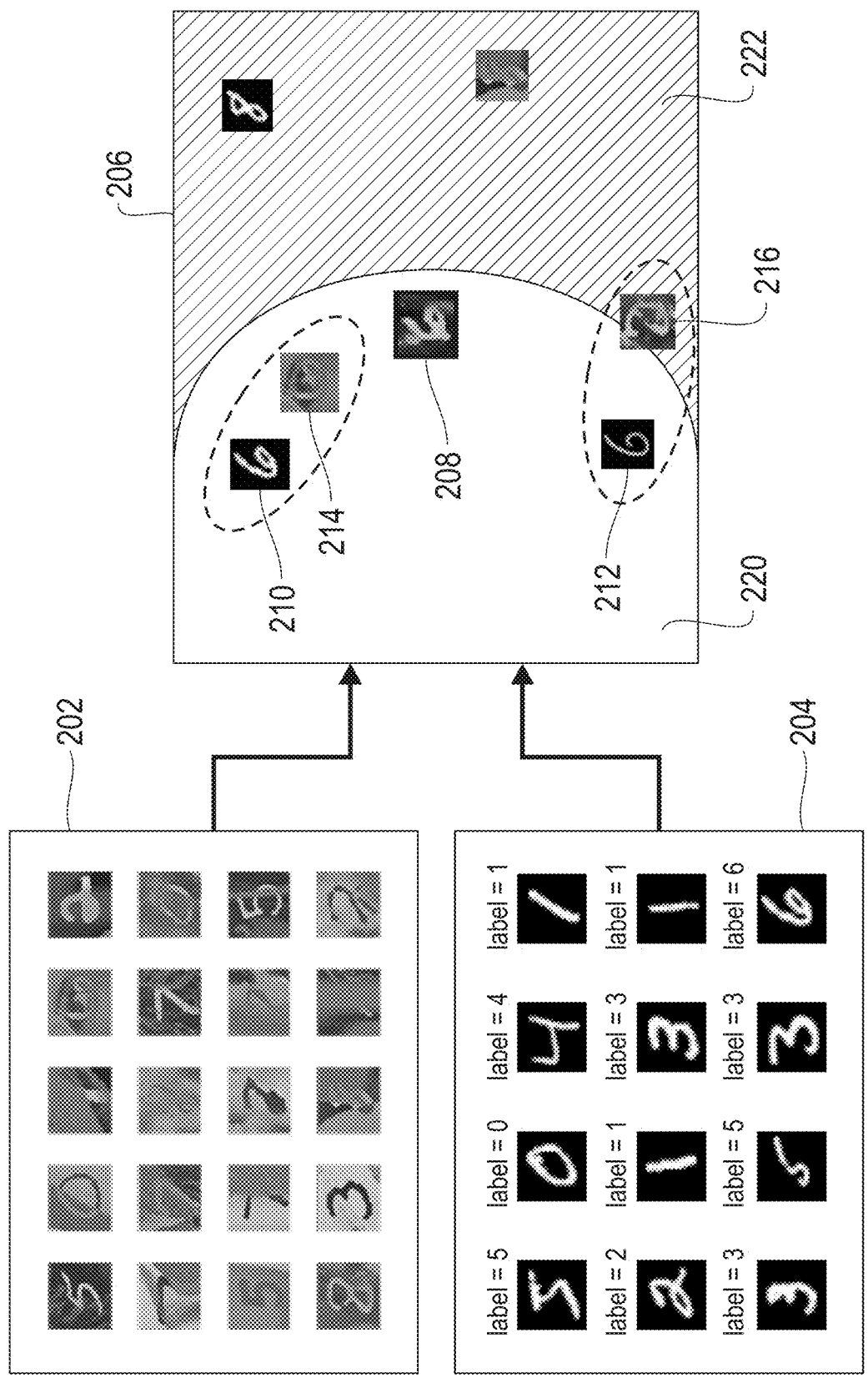
FIG. 2 is a diagram illustrating domain invariant explanation techniques in accordance with exemplary embodiments.

Referring now to FIG. 2, this figure illustrates techniques corresponding to a domain invariant explanation in accordance with exemplary embodiments. The example shown in FIG. 2 shows a representation space 206, which includes domain-invariant representations of source and target samples that are provided by a domain adaptation model. The different shaded regions in the representation space 206 represent boundaries of the domain adaptation model. In this example, the domain adaptation model predicts a label of "6" for samples in region 220, and predicts a label of "8" for samples in region 222. As such, for a given test instance 208, the domain invariant explanation generator 116 may identify the representations of the labeled dataset 204 which are nearest to the test instance 208, which in this example correspond to the representations 210 and 212. Additionally, the domain invariant explanation generator 116 identifies the representations of the unlabeled dataset 202 which are nearest to the test instance 208, which in this example is representations 214, 216. Then, the domain invariant explanation generator 116 creates pairs of the representations, wherein each pair includes a representation from the labeled dataset 204 and the unlabeled dataset 206. In the example depicted in FIG. 2, the example pairs are representations 210 and 214 and representations 212 and 216.

The domain invariant explanations described above are for "distribution matching" based domain adaptation methods. However, it is to be appreciated that the techniques described herein are also applicable to other scenarios. For example, the ranking (or scoring) of the influential training samples may be applicable to any type of classification task (such as, for example, text, image, videos, etc.).

Figure 3:
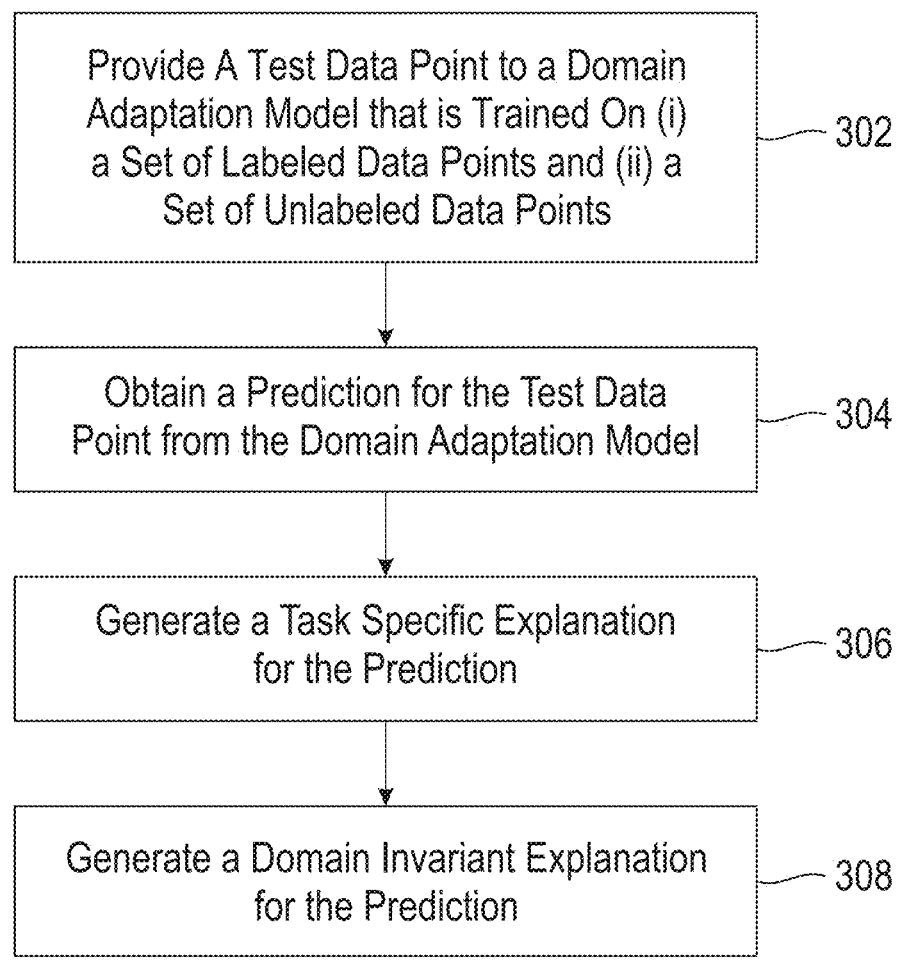
FIG. 3 is a flow diagram illustrating techniques according to an embodiment of the invention.

FIG. 3 is a flow diagram illustrating techniques according to an embodiment of the present invention. Step 302 includes providing at least one test data point to a domain adaptation model, wherein the domain adaptation model is trained on (i) a set of labeled data points and (ii) a set of unlabeled data points. Step 304 includes obtaining at least one prediction for the at least one test data point from the domain adaption model. Step 306 includes generating a task specific explanation for the at least one prediction, the task specific explanation comprising one or more data points from among the sets that satisfy a threshold score for influencing the at least one prediction. Step 308 includes generating a domain invariant explanation for the at least one prediction, wherein the generating comprises ranking pairs of data points based on a statistical similarity to the at least one test data point, wherein each pair comprises (i) a data point from the set of labeled data points and (ii) a data point from the set of unlabeled data points, and wherein the domain invariant explanation comprises at least one of the pairs.

Generating the task specific explanation in step 306 may include scoring each given data point in the set of labeled data points. Generating the task specific explanation in step 306 may include scoring each given data point in the set of unlabeled data points. The scoring may include applying an influence function that measures change in the prediction for the at least one test data point when training the domain adaptation model without the given data point.

Generating the domain invariant explanation in step 308 may include applying a nearest-neighbors algorithm to identify the statistical similarity of the one or more pairs to the at least one test data point. The domain invariant explanation may include a predefined number of the one or more pairs of data points that are ranked the highest.

The process in FIG. 3 may include a step of retraining the domain adaptation model based on one or more of the task specific explanation and the domain invariant explanation. Each of the data points within the set of labeled training data points and the set of unlabeled training data points may correspond to at least one of: (i) a text data point, (ii) an image data point, and (iii) a video data point.

An example of another embodiment includes a computer-implemented method comprising providing at least one test sample as input to a domain adaptation model, wherein the domain adaptation model is trained using (i) a set of unlabeled training samples and (ii) a set of labeled training samples; obtaining, from the domain adaptation model, a prediction for the at least one test sample; determining scores for (i) training samples in the set of unlabeled samples and (ii) training samples in the set of labeled samples, wherein each score is indicative of an influence of a given one of the training samples on the prediction of the at least one test sample; generating a task specific explanation for the prediction based at least in part on the determined scores; generating a domain invariant explanation for the prediction by applying a nearest-neighbors algorithm to identify at least one pair of training samples that are statistically similar to the test sample, wherein the at least one pair comprises (i) one of the labeled training samples and (ii) one of the unlabeled training samples; and outputting the task specific explanation and the domain invariant explanation to debug the domain adaptation model.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
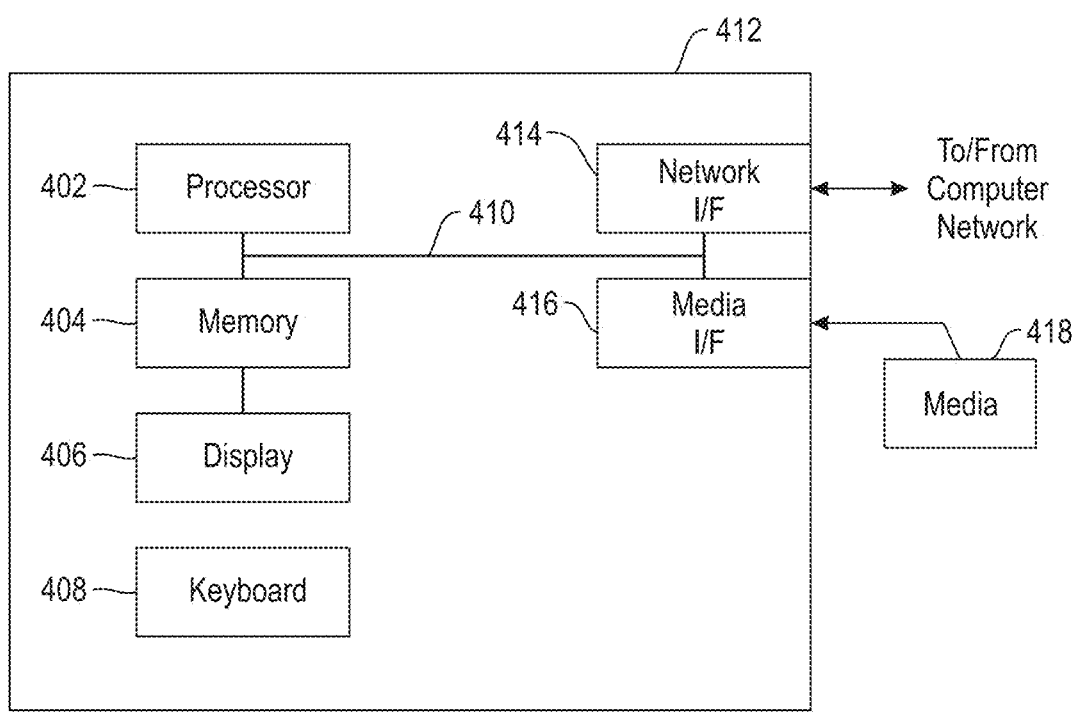
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
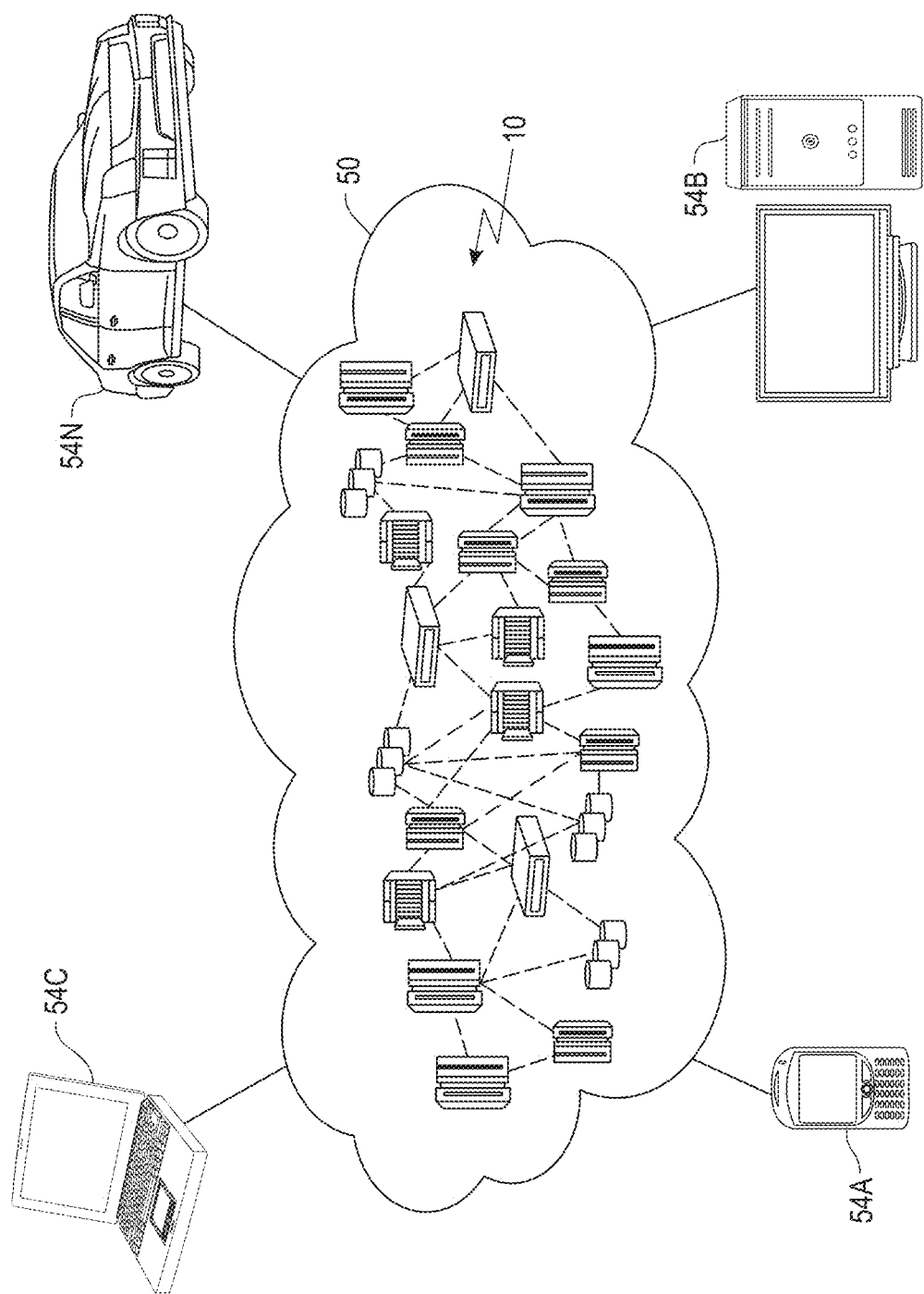
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
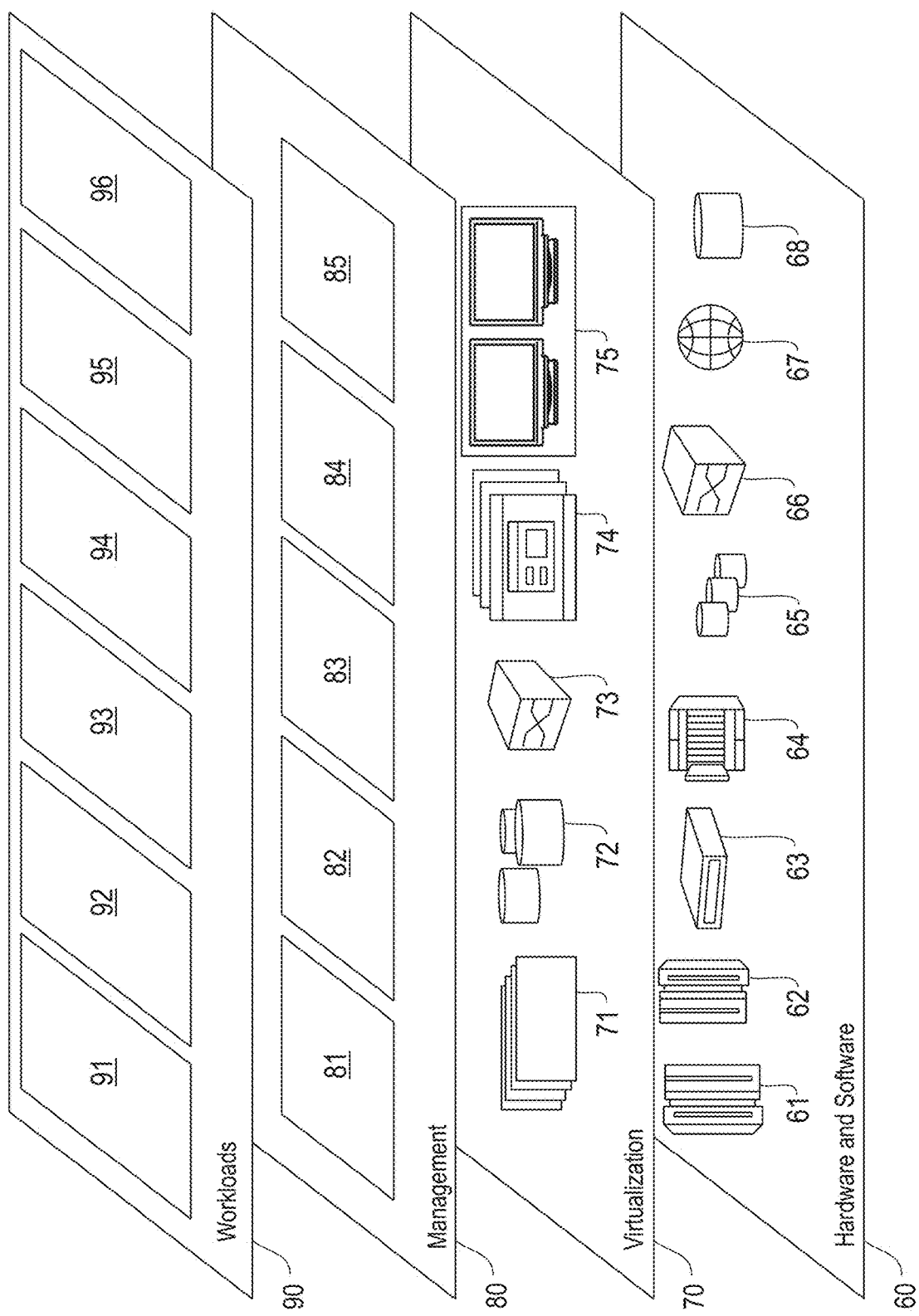
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and explaining cross domain model predictions 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, debugging and interpreting domain adaptation models. Also, at least one embodiment of the present invention may provide a beneficial effect such as, for example, increasing confidence of a model predictions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
providing at least one test data point to a domain adaptation model to obtain at least one prediction, wherein the domain adaptation model is trained on (i) a set of labeled data points and (ii) a set of unlabeled data points;
generating a task specific explanation for the at least one prediction, the task specific explanation comprising one or more data points from among the sets that satisfy a threshold score for influencing the at least one prediction; and
generating a domain invariant explanation for the at least one prediction, wherein said generating comprises ranking pairs of data points based on a statistical similarity to the at least one test data point, wherein each pair comprises (i) a data point from the set of labeled data points and (ii) a data point from the set of unlabeled data points, and wherein the domain invariant explanation comprises at least one of the pairs;
wherein the method is carried out by at least one computing device.

2. The computer-implemented method of claim 1, wherein said generating the task specific explanation comprises scoring each given data point in the set of labeled data points.

3. The computer-implemented method of claim 2, wherein said generating the task specific explanation comprises scoring each given data point in the set of unlabeled data points.

4. The computer-implemented method of claim 2, wherein said scoring comprises applying an influence function that measures change in the prediction for the at least one test data point when training the domain adaptation model without the given data point.

5. The computer-implemented method of claim 1, wherein said generating the domain invariant explanation comprises:
applying a nearest-neighbors algorithm to identify the statistical similarity of the one or more pairs to the at least one test data point.

6. The computer-implemented method of claim 1, wherein the domain invariant explanation comprises a predefined number of the one or more pairs of data points that are ranked the highest.

7. The computer-implemented method of claim 1, comprising:
retraining the domain adaptation model based on one or more of: the task specific explanation and the domain invariant explanation.

8. The computer-implemented method of claim 1, wherein each of the data points within the set of labeled training data points and the set of unlabeled training data points corresponds to at least one of: (i) a text data point, (ii) an image data point, and (iii) a video data point.

9. A computer program product comprising a computer readable storage medium having program instructions embodied therewith, the program instructions executable by a computing device to cause the computing device to:
provide at least one test data point to a domain adaptation model to obtain at least one prediction, wherein the domain adaptation model is trained on (i) a set of labeled data points and (ii) a set of unlabeled data points;
generate a task specific explanation for the at least one prediction, the task specific explanation comprising one or more data points from among the sets that satisfy a threshold score for influencing the at least one prediction; and generate a domain invariant explanation for the at least one prediction, wherein the generating comprises ranking pairs of data points based on a statistical similarity to the at least one test data point, wherein each pair comprises (i) a data point from the set of labeled data points and (ii) a data point from the set of unlabeled data points, and wherein the domain invariant explanation comprises at least one of the pairs.

10. The computer program product of claim 9, wherein said generating the task specific explanation comprises scoring each given data point in the set of labeled data points.

11. The computer program product of claim 10, wherein said generating the task specific explanation comprises scoring each given data point in the set of unlabeled data points.

12. The computer program product of claim 10, wherein said scoring comprises applying an influence function that measures change in the prediction for the at least one test data point when training the domain adaptation model without the given data point.

13. The computer program product of claim 9, wherein said generating the domain invariant explanation comprises:
applying a nearest-neighbors algorithm to identify the statistical similarity of the one or more pairs to the at least one test data point.

14. The computer program product of claim 9, wherein the domain invariant explanation comprises a predefined number of the one or more pairs of data points that are ranked the highest.

15. The computer program product of claim 9, wherein the program instructions cause the computing device to:
retrain the domain adaptation model based on one or more of: the task specific explanation and the domain invariant explanation.

16. The computer program product of claim 9, wherein each of the data points within the set of labeled training data points and the set of unlabeled training data points corresponds to at least one of: (i) a text data point, (ii) an image data point, and (iii) a video data point.

17. A system comprising:

a memory; and at least one processor operably coupled to the memory and configured for:

providing at least one test data point to a domain adaptation model to obtain at least one prediction, wherein the domain adaptation model is trained on (i) a set of labeled data points and (ii) a set of unlabeled data points;

generating a task specific explanation for the at least one prediction comprising, the task specific explanation one or more data points from among the sets that satisfy a threshold score for influencing the at least one prediction; and generating a domain invariant explanation for the at least one prediction, wherein the generating comprises ranking pairs of data points based on a statistical similarity to the at least one test data point, wherein each pair comprises (i) a data point from the set of labeled data points and (ii) a data point from the set of unlabeled data points, and wherein the domain invariant explanation comprises at least one of the pairs.

18. The system of claim 17, wherein said generating the task specific explanation comprises scoring each given data point in the set of labeled data points.

19. The system of claim 18, wherein said generating the task specific explanation comprises scoring each given data point in the set of unlabeled data points.

* * * * *